April 22, 1958 W. K. SCHNEPF 2,831,354
WINDSHIELD WIPER ACTUATING MECHANISM
Filed Nov. 6, 1953 2 Sheets-Sheet 1

INVENTOR.
WILLIAM K. SCHNEPF
BY George H. Strickland
HIS ATTORNEY

April 22, 1958 W. K. SCHNEPF 2,831,354
WINDSHIELD WIPER ACTUATING MECHANISM
Filed Nov. 6, 1953 2 Sheets-Sheet 2
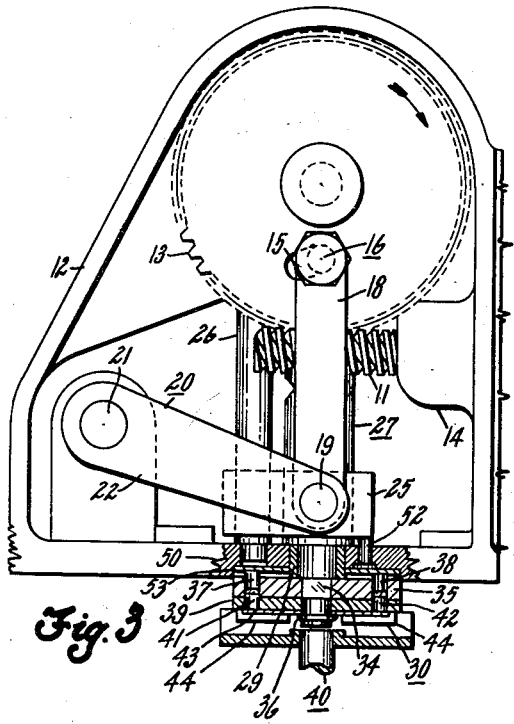
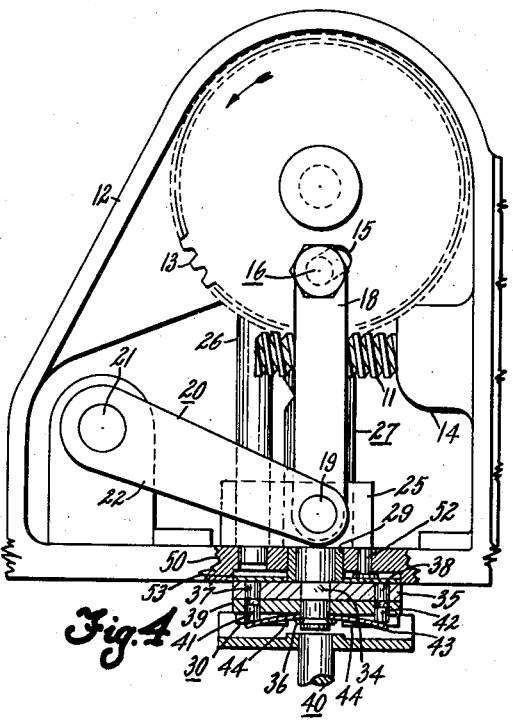
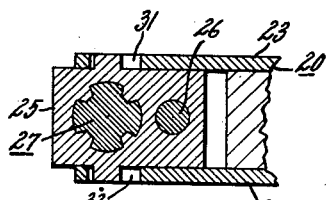
INVENTOR.
WILLIAM K. SCHNEPF
BY George H. Strickland
HIS ATTORNEY United States Patent Office 2,831,354
Patented Apr. 22, 1958

2,831,354

WINDSHIELD WIPER ACTUATING MECHANISM

William K. Schnepf, Webster, N. Y., assignor to General Motors Corporation, Detroit, Mich., a corporation of Delaware Application November 6, 1953, Serial No. 390,603

16 Claims. (Cl. 74—70)

This invention pertains to motion converting means, and particularly to actuating mechanism for operating windshield wipers.

It is recognized that in some respects, power driven windshield wipers are vastly superior to suction driven wipers. This result obtains by reason of the fact that power wipers, driven by either an electric motor or by the motor vehicle engine, are more reliable in operation. This invention relates to an improved mechanism for actuating windshield wipers, and specifically to a simplified mechanical movement for converting rotation into oscillation, together with means for varying the amplitude of oscillation imparted to a driven member. Accordingly, among my objects are the provision of a mechanical movement for converting rotation into oscillation including means to vary the amplitude of oscillation; the further provision of windshield wiper actuating mechanism incorporating the aforesaid mechanical movement; and the still further provision of automatic means to disrupt the operative connection between the mechanical movement and the wiper blade when the amplitude of oscillation is a maximum.

The aforementioned and other objects are accomplished in the present invention by providing a crank mechanism including a crank, the effective length of which may be varied so as to alter the amplitude of oscillation imparted to a driven member. Specifically, the mechanical movement includes a crank, the effective length of which depends upon the direction in which the driving member is rotated. Moreover, although as disclosed herein, the driving member is rotated by a reversible electric motor, it is to be understood that this is only exemplary.

The electric motor shaft is drivingly connected to a worm gear having a crank pin, the radial position of which depends upon the direction of worm gear rotation. The crank pin is pivotally connected to one end of a connecting rod, the other end of which is connected to a free end of a yoke adapted for swinging movement about a fixed pivot point. The yoke carries an internally threaded element which has operative engagement with an externally threaded element, or member, that is suported for rotation. Accordingly, upon swinging movement of the yoke, reciprocation is imparted to the nut element which, in turn, effects, and is dependent upon rotation, or more particularly, oscillation of the screw element.

The screw element is operatively connected through an automatically disengageable and engageable clutch to the wiper transmission. The clutch is engaged when the effective operating length of the crank is a minimum, and is automatically disengaged by the nut at one end of its stroke, when the effective operating length of the crank is a maximum. Thus, means are provided for driving the wiper blades to a parked position outside of the normal range of vision, after which the wiper transmission is disengaged from the mechanical movement. Thereafter, any suitable switch means may be operated to deenergize the motor, and the motor may coast to a standstill without altering the blade position.

Further objects and advantages of the present invention will be apparent from the following description, reference being had to the accompanying drawings wherein a preferred embodiment of the present invention is clearly shown.

In the drawings:

Fig. 3 is a fragmentary sectional view taken in the direction of arrow 3 of Fig. 2 and depicting the operating position of the mechanical movement.

Fig. 4 is a view similar to Fig. 3, which depicts the parked position of the mechanical movement.

Fig. 5 is a fragmentary sectional view taken along line 5—5 of Fig. 1.

Figure 1:
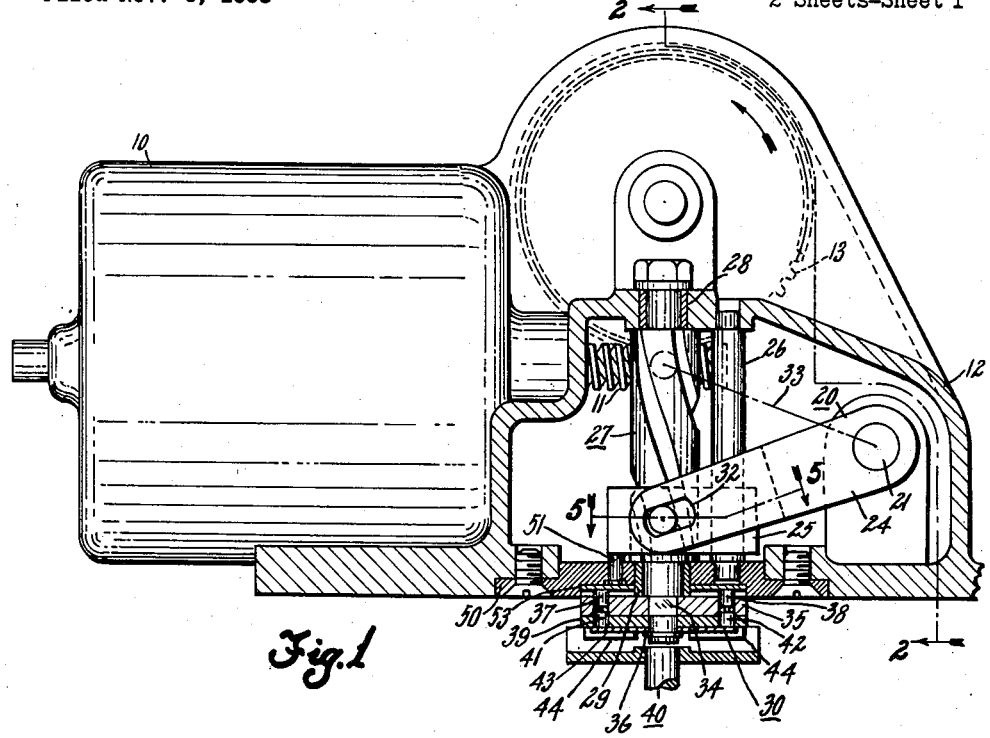
Fig. 1 is a view, partly in elevation and partly in section, of the improved actuating mechanism.

With particular reference to Fig. 1, the actuating mechanism is shown including a reversible electric motor 10, the shaft of which is formed as a worm 11. The motor casing supports a housing 12, which encloses the mechanical movement, to be described. The mechanical movement is operatively connected through a clutch designated by the numeral 30 to a driven shaft, or member, 40, to which wiper blades, not shown, are operatively connected by means of a transmission, likewise not shown.

Figure 2:
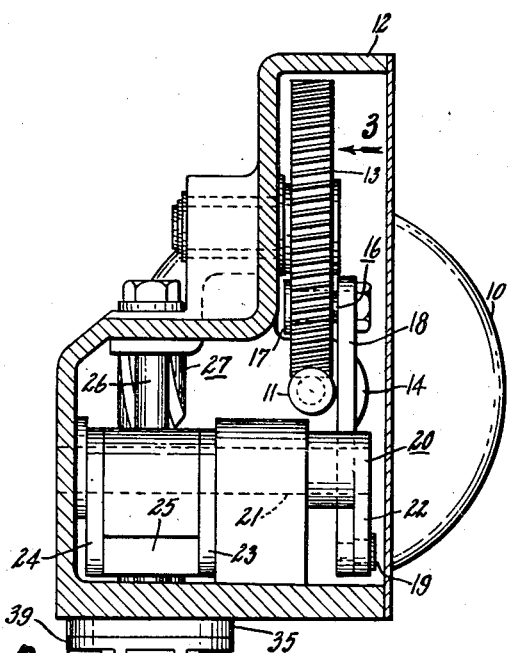
Fig. 2 is a sectional view taken along line 2—2 of Fig. 1.

The mechanical movement disposed within the housing 12 includes a worm gear 13, which has operative engagement with the worm 11, which, as is shown in Fig. 2, is carried by a shaft rotatably supported by a bearing means 14 within the housing 12. As is more particularly shown in Figures 3 and 4, the worm gear 13 is formed with a slot 15 of varying radial distance from the axis of the worm gear. The slot 15 receives a crank pin 16, one end being formed with a flange 17 and the other end being pivotally connected to one end of a connecting rod 18, so as to retain the crank pin within the slot. It will further be appreciated that by reason of the slot 15 being of varying radial distance from the worm gear axis, the combination of the crank pin and the slot constitutes an adjustable length crank arm mechanism. Thus, when the worm gear 13 is rotated in a clockwise direction, as viewed in Fig. 3, the crank arm mechanism is of a minimum length by reason of the crank pin 16 being situated in the slot 15 at the minimum radial distance from the axis of rotation. However, when the worm gear 13 is rotated in a counterclockwise direction, as viewed in Fig. 4, the crank pin 16 will be situated in the slot 15 at a maximum radial distance from the axis of rotation whereby the effective operating length of the crank arm mechanism is the maximum.

The other end of the connecting rod 18 is pivotally connected at 19, as shown in Figures 2, 3 and 4, to one end of a yoke assembly 20. The yoke assembly is rotatably supported on a stub shaft 21 and includes three axially spaced arms 22, 23 and 24. The connecting rod 18 is pivotally connected to the end of arm 22, while the arms 23 and 24, as shown in Fig. 5, are operatively connected to an internally threaded element, or nut, 25. The nut 25 is restrained against rotation by reason of its having operative engagement through an aperture thereof with a stationary guide post 26. The internally threaded nut also has operative engagement with an externally threaded element, or screw, 27, which is rotatably supported by bearing means 28 and 29 within the housing 12. The element 27 is provided with high lead helical splines, and, as shown in Fig. 1, is restrained against axial movement. Now, inasmuch as the nut 25 is restrained against rotation, it will be apparent that upon swinging movement of the yoke assembly 20 about the shaft 21, reciprocation will be imparted to the nut 25, which will, in turn, effect rotation of the screw shaft 27, or more particularly, oscillation of the screw shaft 27.

As is particularly shown in Figs. 1 and 5, the arms 23 and 24 are formed with elongated openings, or slots, 31 and 32, which are received by transversely extending pins of the nut 25. This provision is made inasmuch as during swinging movement of the yoke assembly 20, the ends of the slots 31 and 32 will vary with respect to the rotative axis of the screw 27. During normal operation of the actuating mechanism which is depicted by clockwise movement of the worm wheel 13 in Fig. 1, and counter-clockwise rotation of the worm wheel 13 in Fig. 3, the limits of swinging movement imparted to the yoke assembly 20 by the connecting rod 18 are indicated by the solid line position of the arm 24 in Fig. 1 and the dotted line 33.

The lower end of the screw element 27 is of reduced diameter and is formed with a flat portion 34, as shown in Figs. 1, 3 and 4. The flat portion 34 is received by an oblong opening in the driving member 35 of the clutch 30. Thus, the member 35 is connected to rotate, or oscillate, with the shaft 27. The extreme lower portion of the shaft 27 is of reduced diameter and is formed with an annular groove which receives a snap ring 36 for a purpose to be described hereinafter. The driving clutch member 35 is provided with a pair of diametrically opposed openings which receive pins 37 and 38. The driven clutch member 39 is rotatably supported about the shaft 27, and is also provided with a pair of diametrically opposed openings, in radial alignment with the openings in the driving member 35, the openings in the driven member receiving pins with hemispherical heads 41 and 42. The pins 41 and 42 are normally maintained in engagement with the openings in both the driving and driven clutch members by a spring 43, which is retained in engagement with the pins 41 and 42 by the snap ring 36. It will be apparent to those skilled in the art that when the pins 41 and 42 are in engagement with the openings in both members 35 and 39, oscillation imparted to the member 35 will likewise be imparted to the member 39, which is operatively connected to the driven member including the shaft 40. The driven member 40 is operatively connected to the driven clutch member 39 by interengaging lugs and grooves 44 and 45, as shown in Fig. 2.

As is particularly seen in Fig. 1, the housing 12 is formed with an opening that receives a plate 50, the plate being detachably secured to the housing 12 by means of screw devices. The plate 50 carries the plain bearing 29 for the lower end of shaft 27 and is formed with a plurality of openings which receive headed pins, such as the one indicated by the numeral 51 in Fig. 1 and the numeral 52 in Figs. 3 and 4. The headed pins are normally maintained in their uppermost position, as shown in Figs. 1 and 3, by means of a washer 53, which is supported on the upper ends of pins 37 and 38. The series of pins, two of which are designated by the numerals 51 and 52, are positioned so that they are engageable by the nut 25 when the length of the crank arm is increased to a maximum. Thus, as is shown in Fig. 4, when the worm wheel 13 is rotated in the direction of the arrow, the length of the crank arm mechanism is automatically increased to a maximum, whereupon the swinging movement imparted to the yoke assembly by the connecting rod is increased so that the nut 25 has imparted thereto reciprocation of greater amplitude, whereupon it will be moved into engagement with the pins 51 and 52 so as to effect axial movement of the washer 53 and the pins 37 and 38 to disenage the clutch 30 by moving pins 41 and 42 axially out of the openings in the driving clutch member 35. Thereafter, continued rotation of the worm wheel 13 and swinging movement of the yoke assembly 20 will impart no further movement to the driven member 40, which is then in a position to park the wiper blades, not shown, out of the normal range of vision and against the cowl of the motor vehicle, likewise not shown.

*Operation*

In operation, the actuating mechanism may be driven by either a reversible electric motor, such as indicated by the numeral 10, or by an engine driven shaft, the direction of rotation of which may be reversed by any suitable gearing, as is well known in the art. If the worm 11 is driven by a reversible electric motor, the energizing circuit therefor may be similar to the type disclosed in Patent No. 2,308,212 Scott-Iversen, et al., wherein the reversible electric motor circuit includes a reversing switch and an automatically operable parking switch for deenergizing the motor when the crank throw is the maximum. In the actuating mechanism disclosed herein the parking switch may be actuated either by the nut 25 when it is moved to the position shown in Fig. 4, or by the washer 53, when the washer is moved to the position of Fig. 4. Irrespective of the operating means for the parking switch, not shown, it will be appreciated that some means should be provided for interrupting the transmission of torque to the worm gear 13 after the clutch 30 is disengaged.

In normal operation, the clutch 30 will be engaged as is shown in Figs. 1, 2 and 3, and, accordingly, when rotation is imparted to the worm gear 13 by the worm 11 in the direction of the arrows in Figs. 1 and 3, the crank pin 16 will be positioned in the slot 15 so that the throw thereof is a minimum. Consequently, upon rotation of the worm wheel, swinging movement will be imparted to the yoke assembly 20 by the connecting rod 18 so as to impart reciprocation to the nut 25. Now, as reciprocation of the nut 25 is dependent upon rotation of the screw shaft 27, during reciprocation of the nut 25 by the yoke assembly 20, oscillation will be imparted to the shaft 27 and the driving clutch member 35. Furthermore, inasmuch as the clutch 30 is engaged, oscillation imparted to member 35 will be transmitted by the pins 41 and 42 to member 39, which will, in turn, be transmitted to the driven member of the actuating mechanism 40, and, thence, to the wiper blades, not shown.

Accordingly, the wiper blades will be moved throughout an oscillatory path over the surface of a vehicle windshield, not shown. When it is desired to park the wiper blades out of the normal range of vision, the direction of rotation of the worm gear 13 is reversed by reversing the direction of rotation of the worm 11. If an electric motor is used as the torque supplying device, the switching is manipulated so as to reverse the direction of rotation, whereas if the worm 11 is driven from the engine, the transmission between the worm 11 and the engine driven shaft must be adjusted so as to reverse the direction of rotation. However, whatever the means of imparting rotation to the worm 11 be, it will be appreciated that when the worm gear 13 is rotated in the direction of the arrow in Fig. 4, the throw of the crank mechanism will be automatically increased so that swinging movement of a greater amplitude is imparted to the yoke assembly 20 by the connecting rod 18. Accordingly, the wiper blades will be moved beyond their normal wiping stroke and to a parked position when the nut 25 is moved to the position shown in Fig. 4, whereupon the series of pins 51 and 52 will automatically effect disengagement of the clutch 30 so that continued rotation of the worm gear 13 will not alter the position of the wiper blades, not shown. Thereafter, the torque supplying means may be deenergized, either manually, or when a reversible electric motor is employed by automatic actuation of a parking switch, not shown, which may be operatively associated with the nut 25. When operation is resumed by upward movement of the nut 25, in Fig. 4, the spring 43 will effect movement of the pins 41 and 42 into the openings of the member 35 to engage the clutch 30.

From the foregoing, it is manifest that the present invention provides a unique mechanical movement particularly adapted for actuating windshield wipers. Moreover, the mechanical movement is designed so that the amplitude of oscillation imparted to the driven member may be varied at will. Furthermore, the instant actuating mechanism includes clutch means for disconnecting the mechanical movement from the driven member when the wiper blades are moved to a parked position so that continued operation of the mechanical movement, due, for instance, to coasting motor inertia, will not alter the position of the wiper blades.

While the embodiment of the present invention as herein disclosed, constitutes a preferred form, it is to be understood that other forms might be adopted.

What is claimed is as follows:

1. Actuating mechanism for a windshield wiper including, a reversely rotatable driving member, an oscillatable driven member, a mechanical movement interconnecting the driving and driven members and establishing a driving connection therebetween for imparting oscillation to the driven member upon rotation of the driving member and including means for varying the amplitude of oscillation imparted to said driven member upon reversal of the direction of rotation of said driving member, and means to interrupt the driving connection between the driving and driven members when the amplitude of oscillation imparted to the driven member is a maximum.

2. Windshield wiper actuating mechanism including in combination, a reversely rotatable driving member, an oscillatable driven member, means interconnecting said members and establishing a driving connection therebetween for imparting oscillation to said driven member upon rotation of said driving member and operable to vary the amplitude of oscillation imparted to said driven member dependent upon reversal of the direction of rotation of said driving member, and automatically operable means for interrupting the driving connection between the driving and driven members when the amplitude of oscillation imparted to said driven member is a maximum.

3. Windshield wiper actuating mechanism including in combination, a rotatable driving member, an oscillatable driven member, means interconnecting said members and establishing a driving connection therebetween for imparting oscillation to said driven member upon rotation of said driving member, said means including a crank mechanism having a variable length crank arm, the length of which is automatically variable in response to the direction of rotation of the driving member for varying the amplitude of oscillation imparted to the driven member upon rotation of the driving member, and means operable to automatically interrupt the driving connection between the driving and driven members when the amplitude of oscillation imparted to the driven member is a maximum.

4. Windshield wiper actuating mechanism including in combination, a rotatable driving member, an oscillatable driven member, means interconnecting said members and establishing a driving connection therebetween for imparting oscillation to said driven member upon rotation of said driving member, said means including crank mechanism, the throw of which is automatically variable in response to the direction of rotation of the driving member and a connecting rod having operative connection with said crank mechanism, and means operable to automatically interrupt the driving connection between the driving and driven members when the amplitude of oscillation imparted to the driven member is a maximum.

5. Windshield wiper actuating mechanism including in combination, a rotatable driving member, an oscillatable driven member, means interconnecting said members and establishing a driving connection therebetween for imparting oscillation to said driven member upon rotation of said driving member, said means including crank mechanism, the throw of which is automatically variable in response to the direction of rotation of the driving member, a connecting rod, and a pivotally mounted yoke assembly, said connecting rod having operative connection with the crank mechanism and said yoke assembly, and means operable to automatically interrupt the driving connection between the driving and driven members when the amplitude of oscillation imparted to the driven member is a maximum.

6. Windshield wiper actuating mechanism including in combination, a rotatable driving member, an oscillatable driven member, means interconnecting said members and establishing a driving connection therebetween for imparting oscillation to said driven member upon rotation of said driving member, said means including crank mechanism, the throw of which is automatically variable in response to the direction of rotation of the driving member, a connecting rod, a pivotally mounted yoke assembly, said connecting rod having operative connection with the crank mechanism and the yoke assembly whereby upon rotation of the driving member, swinging movement will be imparted to the yoke assembly, and a reciprocable element operatively connected to and movable by said yoke assembly, and means operable to automatically interrupt the driving connection between the driving and driven members when the amplitude of oscillation imparted to the driven member is a maximum.

7. Windshield wiper actuating mechanism including in combination, a rotatable driving member, an oscillatable driven member, means interconnecting said members and establishing a driving connection therebetween for imparting oscillation to said driven member upon rotation of said driving member, said means including crank mechanism, the throw of which is automatically variable in response to the direction of rotation of the driving member, a connecting rod, a pivotally mounted yoke assembly, said connecting rod having operative connection with the crank mechanism and the yoke assembly whereby upon rotation of the driving member, swinging movement will be imparted to the yoke assembly, a reciprocable element operatively connected to and movable by said yoke assembly, and a rotatable element having operative engagement with said reciprocable element whereby movement of said reciprocable element will impart oscillation to said rotatable element, and means operable to automatically interrupt the driving connection between the driving and driven members when the amplitude of oscillation imparted to be driven member is a maximum.

8. The combination set forth in claim 7 wherein said reciprocable element comprises an internally threaded member and said rotatable element comprises an externally threaded member.

9. The combination set forth in claim 7 wherein said driving member is formed with a slot of varying radial distance from its rotative axis, and wherein said crank mechanism includes a crank pin carried by said driving member and confined within said slot.

10. Windshield wiper actuating mechanism including in combination, a reversely rotatable driving member, an oscillatable driven member, means interconnecting and establishing a driving connection between the driving and driven members operable to impart oscillation to the driven member upon rotation of the driving member, said means also being operable to vary the amplitude of oscillation imparted to said driven member upon reversal of the direction of rotation of the driving member, and clutch means operatively associated with said driven member and said means and operable by the said means for interrupting the driving connection between said driving and driven members when the amplitude of oscillation imparted to said driven member is a maximum.

11. The combination set forth in claim 10 wherein said clutch means comprises a driving clutch member, a driven clutch member, and a plurality of pins engageable with said clutch members and operable to drivingly connect said clutch members.

12. The combination set forth in claim 10 wherein the means interconnecting the driving and driven members includes a reciprocable element, said reciprocable element being operatively connected with said clutch means so that when the amplitude of movement imparted to said element is a maximum, the said element will automatically disengage said clutch means.

13. The combination set forth in claim 12 wherein the operative connection between the said reciprocable element and the clutch means comprises a plurality of pins engageable with the said element and movable thereby so as to disengage said clutch means.

14. Windshield wiper actuating mechanism including in combination, a rotatable driving member, an oscillatable driven member, means interconnecting said members for imparting oscillation to said driven member upon rotation of said driving member, said means including crank mechanism, the throw of which is automatically variable in response to the direction of rotation of the driving member, a connecting rod, a pivotally mounted yoke assembly, said connecting rod having operative connection with the crank mechanism and the yoke assembly whereby upon rotation of the driving member, swinging movement will be imparted to the yoke assembly, a reciprocable element operatively connected to and movable by said yoke assembly, and a rotatable element having operative engagement with said reciprocable element whereby reciprocation of said reciprocable element will impart oscillation to said rotatable element, disengageable clutch means interconnecting said rotatable element and said driven member comprising a driving clutch member connected to said rotatable element, a driven clutch member connected to said oscillatable driven member and a first pair of pins engageable with said clutch and establishing a driving connection between said clutch members, and means operable by said reciprocable element for automatically disengaging said clutch means when the amplitude of oscillation imparted to said oscillatable driven member is a maximum.

15. The combination set forth in claim 14 wherein the clutch disengaging means comprises a second pair of pins carried by said driving clutch member and engaging said first pair of pins, and means engageable with said second pair of pins and operatively connected with said reciprocable element for effecting movement of said second pair of pins which, in turn, effect movement of said first pair of pins to thereby interrupt the driving connection between said driving and driven clutch members when the oscillation imparted to said oscillatable driven member is a maximum.

16. The combination set forth in claim 15 wherein the operative connection between said reciprocable element and said second pair of pins comprises a third pair of pins and a washer, said washer being disposed between and engaging said second and third pairs of pins.

References Cited in the file of this patent

UNITED STATES PATENTS

| | | |
|---|---|---|
| 2,308,212 | Scott-Iversen | Jan. 12, 1943 |
| 2,450,692 | Sacchini | Oct. 5, 1948 |
| 2,452,496 | Schneider | Oct. 26, 1948 |
| 2,513,247 | Morton | June 27, 1950 |
| 2,651,802 | Kearful | Sept. 15, 1952 |